United States Patent [19]
Billing

[11] 3,811,052
[45] May 14, 1974

[54] ELECTRICAL FREQUENCY INDICATING MEANS

[75] Inventor: Peter George Billing, Stamford, England

[73] Assignee: N. J. Froment & Co., Stamford, England

[22] Filed: Jan. 24, 1973

[21] Appl. No.: 326,422

[52] U.S. Cl.................. 307/233, 307/269, 328/133
[51] Int. Cl. ............................................. H03k 5/20
[58] Field of Search ............ 307/233, 269; 328/133, 328/155, 63

[56] References Cited
UNITED STATES PATENTS
3,544,907  12/1970  Bleickardt.......................... 307/269
3,312,903  4/1967   Webb................................. 328/155
3,663,956  5/1972   Puroy................................ 328/133
3,721,909  3/1973   Pincus............................... 307/233

Primary Examiner—Rudolph V. Rolinec
Assistant Examiner—Ro E. Hart
Attorney, Agent, or Firm—Holman & Stern

[57] ABSTRACT

The invention describes means for monitoring electrical supply frequency suitable for use with an AC generator coupled to a prime motor e.g. through the auxiliary gearbox of an agricultural tractor to the engine thereof, for the purpose of providing emergency AC electrical power for lighting or heating in the event of a cut in normal power supplies. The monitoring means includes a pulse generator operable to produce a series of pulses within a predetermined operating range and a switching device operable when the frequency of pulses of the normal AC supply are outside acceptable limits compared with the monitoring means. The use of a tractor makes the invention of particular importance to farmers having milking machinery, chicken feeders and incubators to run.

3 Claims, 3 Drawing Figures

ELECTRICAL FREQUENCY INDICATING MEANS

This invention relates to indicating means for use in an alternating current electrical supply and which are connected or connectible into such a supply so as to give an indication of the frequency of the supply; such indicating means will hereinafter be referred to as "indicating means for the purpose described."

An indicating means for the purpose described in accordance with the present invention is particularly, but by no means exclusively, suitable for use with an arrangement comprising an AC generator coupled with a prime-mover, e.g. through the auxiliary gearbox of a tractor to the engine of the latter, for the purpose of providing emergency AC electrical power for lighting or heating etc. Such an arrangement is often provided for use by farmers so that essential machinery such as milking machinery, chicken feeders and brooders can be used during power cuts.

It is important that the frequency of an emergency supply derived from such an arrangement is maintained within a closely predetermined range to avoid damage to and/or changes in operation of any frequency-dependent machinery connected thereto. For this reason it is necessary to set the engine of the prime mover to run at a speed which is determined by the velocity ratio of the coupling to the generator and the number of poles of the latter and to adjust the engine to maintain this speed when necessary.

The setting of the speed of the engine is customarily carried out with reference to a tachometer associated with the engine. This requires a certain amount of skill and prior knowledge of the construction of the generator concerned and of the coupling to the engine. In any event setting the speed in this manner is inaccurate because of the inherent inaccuracy of many commercially available tachometers and in particular those which are supplied as original equipment with most tractors.

Alternatively, the generator may be associated with any of the commonly known forms of frequency-meter, e.g. a so called reed frequency indicator and the meter may be utilized to determine the frequency of the generator output directly. This is a vastly superior arrangement to that described above. However, a certain amount of skill is necessary in reading the known forms of frequency meter and in effecting corresponding adjustments in the engine speed where necessary.

In addition, both of these prior arrangements require the close attendance of an operator in order to ensure that the frequency is maintained within the predetermined range.

An object of the present invention is to provide an indicating means for the purpose described which overcomes the disadvantages set out above.

According to the present invention an indicating means for the purpose specified comprises an input means which, in use, is connected into an AC electrical supply and which is adapted to produce a first series of pulses at a frequency corresponding to the frequency of the supply, a pulse generator which is adapted to produce a second series of pulses within a predetermined operating range, a switching circuit which receives said first and second series of pulses and is adapted to operate whenever pulses of said first and second series of pulses are in a predetermined phase relationship, and a synchronising circuit for synchronising said second series of pulses with said first series of pulses when the frequency of the latter is within the predetermined operating range of the pulse generator so that, when the frequency of the supply is within said range, said switching circuit operates continuously or substantially so.

The switching circuit is utilized to control an indicating device, preferably an electric lamp, so as to give an indication whenever pulses of the first and second series come into said phase relationship. The lamp will be energised continuously when the frequency of the supply is within said range. Whenever the frequency of the supply is outside said range the synchronising circuit will be ineffective. Thus the pulse generator will supply the second series of pulses within the said range to the switching circuit whilst the first series of pulses derived from the input means will be at a different frequency. As a result the two series of pulses which are fed into the switching circuit will be unsynchronised, i.e. individual pulses of these two series will be either in phase or out of phase, with the result that the switching circuit will be operated intermittently. The frequency of this intermittent operation of the switching circuit, and hence the frequency with which the indicating device is operated, will depend on the frequency with which pulses of the two series come into said predetermined phase relationship, i.e. on the difference between the frequency of the supply and the frequency of operation of the pulse generator. Thus the frequency of operation of the indicating device gives an indication of the amount by which the frequency of the supply has deviated from the said range.

Conveniently the pulse generator is supplied with power through a rectifying circuit which is fed from the AC electrical supply to which the indicating means is connected. Also the indicating device, e.g. the electric lamp, may be energized from the AC electrical supply under the control of the switching circuit.

It will be appreciated that an indicating means in accordance with the invention is easily connectible into an AC electrical supply and, once connected, it gives a clear and readily understandable indication of whether or not the frequency of the supply is within a predetermined range. Where the indicating device is an electric lamp the indication can be observed at a distance both by day and by night. The switching circuit may be arranged to control more than one indicating device so that indication of the supply frequency can be repeated at any convenient position.

For example, where an indicating means in accordance with the invention is connected into an AC electrical supply derived from a tractor driven AC generator one indicating device will be closely associated with the generator; say mounted on the connection box of the generator. A second indicating device may then be associated with the equipment to which the supply is fed, e.g. a milking machine. Thus an operator may set the tractor engine to run at a speed at which the generator supplies AC electrical power within the predetermined range; at this speed the indicating device will be operated continuously. He can then leave the tractor and attend to the equipment. In the event that the speed of the tractor engine deviates from the set speed with the result that the frequency of the electrical supply from the generator deviates outside the said range he will be warned of this by the intermittent operation of the second indicating device and can take appropriate remedial action. If the supply fails entirely for any reason, the indicating device/s will cease to operate and will thereby give a clear warning so that action can be taken.

Typically an indicating means in accordance with the invention is constructed so as to resist mechanical shocks and vibration and all the components of the input means, the pulse generator and the switch circuit are solid state components and are encapsulated in an epoxy resin.

The accompanying drawings show by way of example the circuit of one embodiment of the invention.

In the drawings

Figure 1:
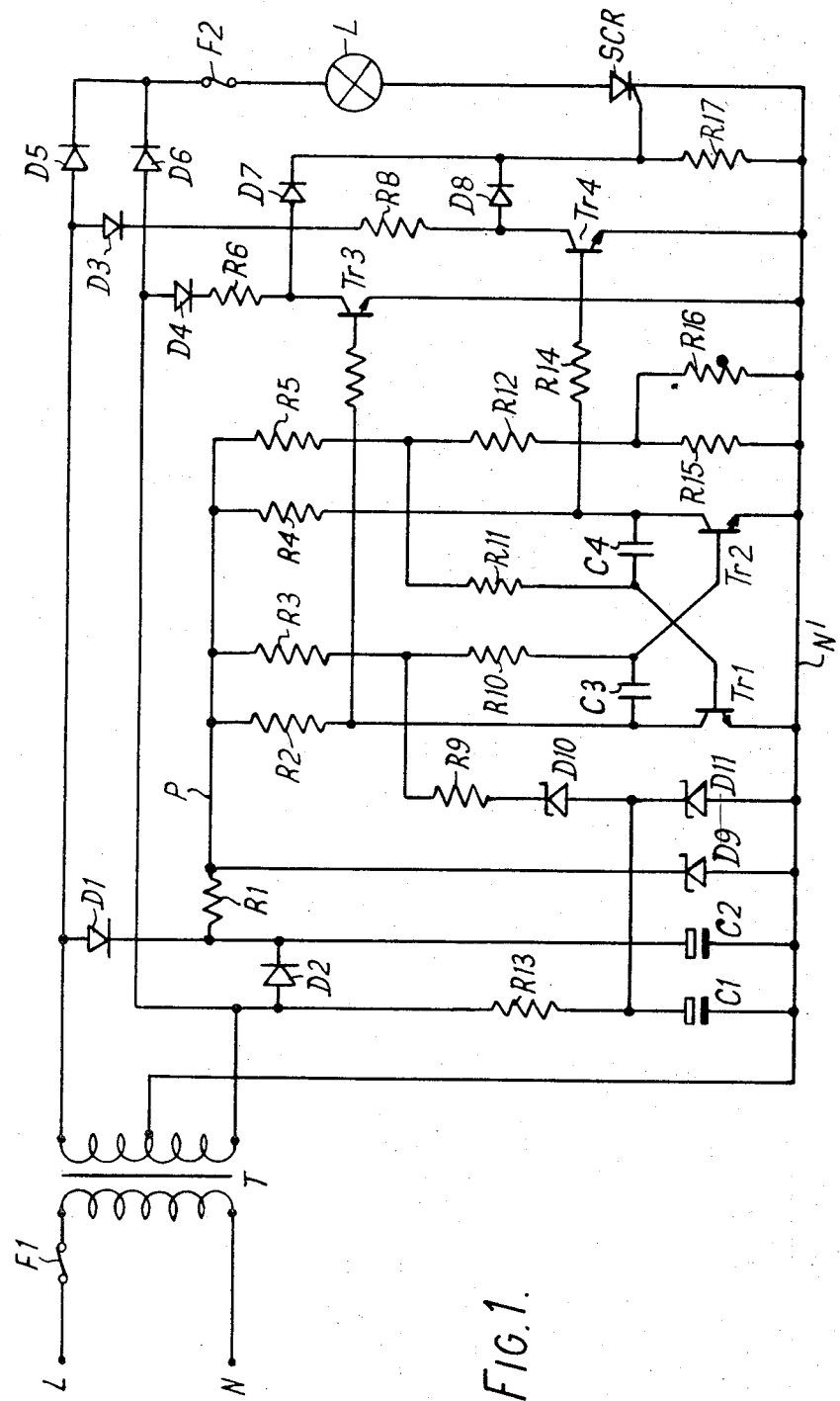
FIG. 1 shows an AC electrical supply connected into the circuit by way of two terminals L and N, a fuse F1 and a transformer T.
Figure 2:
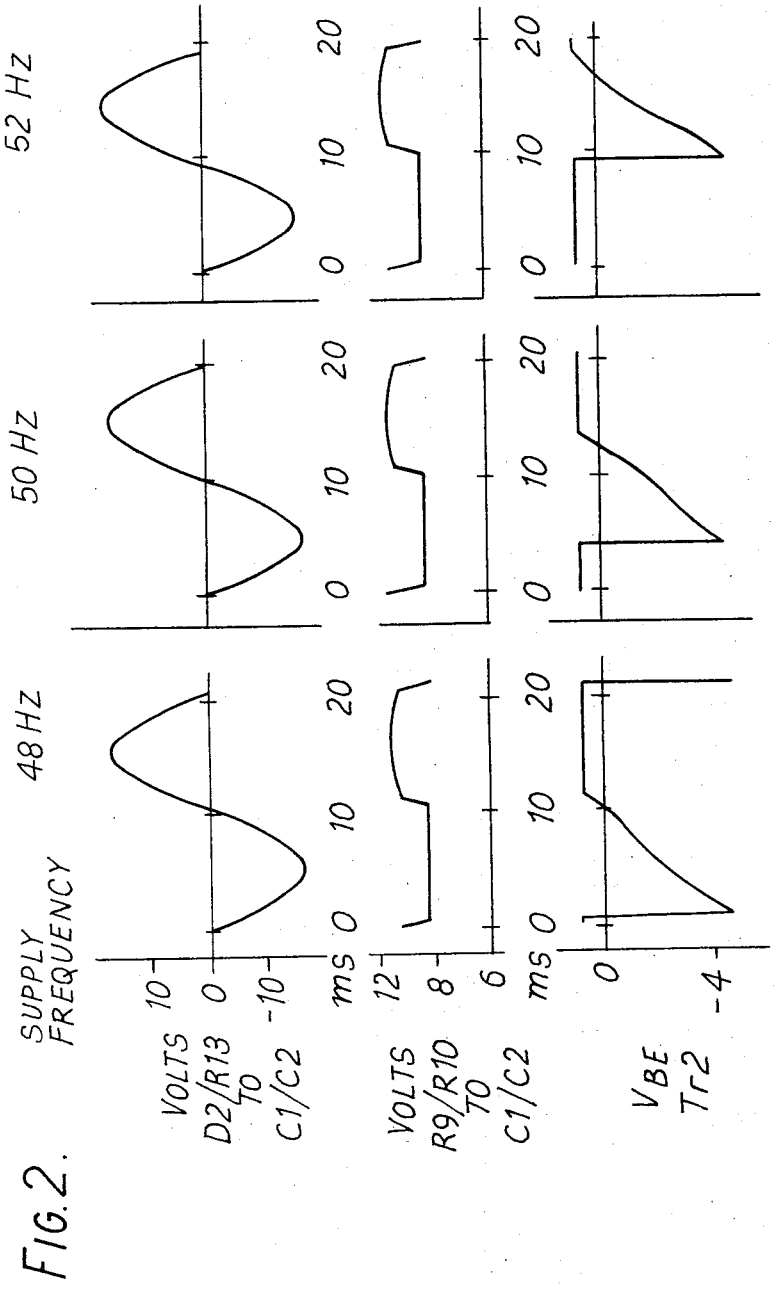
FIGS. 2 and 3 show waveforms at selected points in said circuit.
Figure 3:
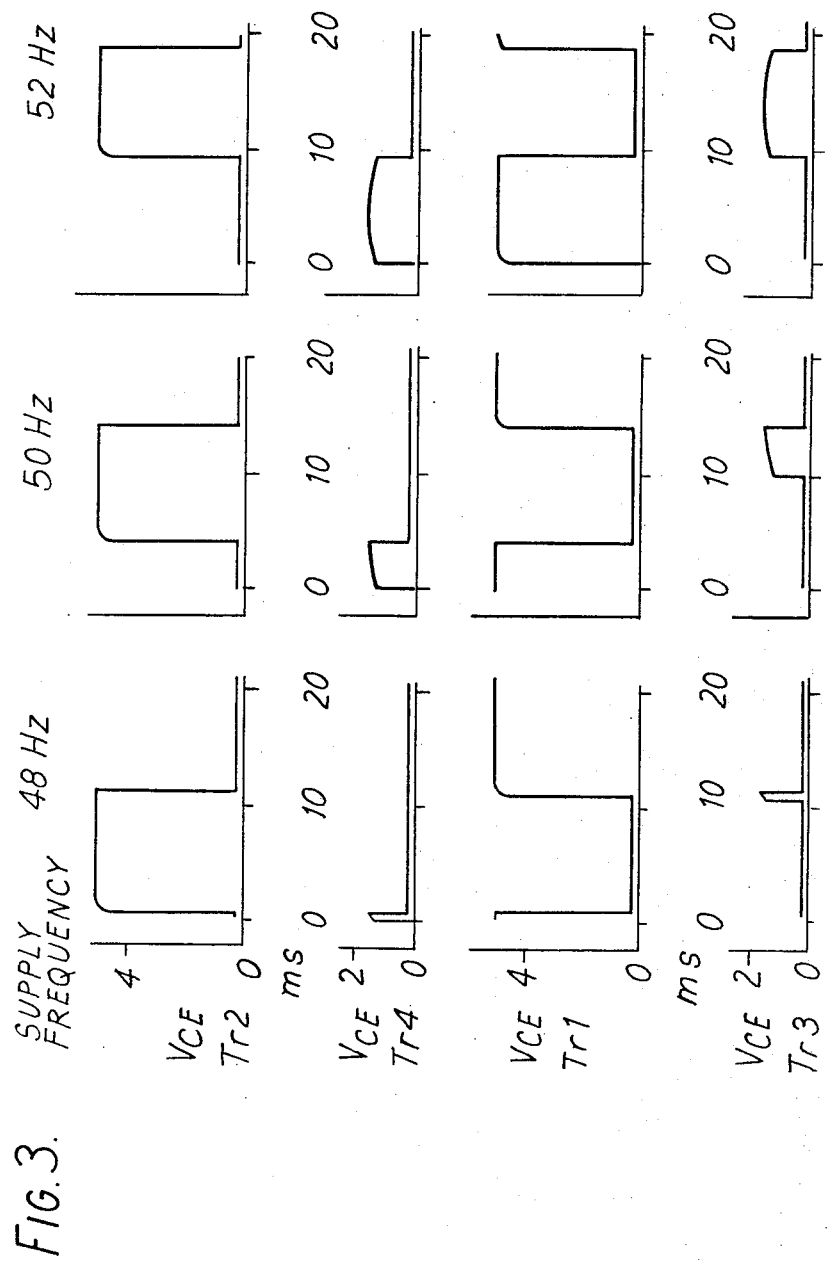

The input means of the invention is constituted by diodes D3 and D4; the pulse generator is constituted by a multivibrator comprising essentially two NPN transistors TR1 and TR2, two capacitors C3 and C4 and two resistors R10 and R11; the switching circuit is constituted by NPN transistors TR3 and TR4, by diodes D7 and D8, and by a silicon controlled rectifier SCR; and the synchronising means is constituted by a capacitor C1, a resistor R13, Zener diodes D10 and D11 and a resistor R9.

The indicating device is an electric lamp L which is supplied with power from the transformer T by way of diodes D5 and D6 and a fuse F2 under the control of the silicon controlled rectifier SCR.

The multivibrator is supplied through positive and negative lines P and N1 respectively with rectified and stabilised power. This power is derived from the transformer T by way of diodes D1 and D2, capacitor C2, resistor R1 and zener diode D9. Resistors R5, R12 and R15 and thermistor R16 provide a supply voltage which varies with temperature changes in such a way as to reduce the effects of similar temperature changes upon the multivibrator frequency of operation.

The timing of the multivibrator is determined primarily by two capacitor-resistance timing circuits constituted by C3 R10 and C4 R11 respectively.

The multivibrator which includes transistors TR1 and TR2 has two quasistable states — one state is with TR1 cut-off and TR2 conducting, the other state is with TR1 conducting and TR2 cut-off.

When power is initially supplied to the multivibrator one or other of the quasi-stable states will occur. Assume TR1 is cut-off and TR2 conducting. TR1 base will gradually become more positive as C4 charges through R11. At the threshold of conduction TR1 will turn on, its collector potential falling rapidly to approximately that of negative line "N". TR2 base potential falls by approximately the same voltage as the change on TR1 collector, being coupled to the latter by C3. TR2 is now cut-off, its base being negative with respect to negative line "N", and TR1 is now conducting. TR2 base now gradually becomes more positive as C3 charges through R10. At the threshold of conduction TR2 will turn on and its collector potential will fall rapidly towards that of negative line "N".

Thus, if the synchronising means were ineffective, the bases of transistors TR3 and TR4 would alternately be energised at a natural frequency of the multivibrator which is determined entirely by the resistors R10 and R11 and the capacitors C3 and C4.

As will be appreciated from the drawing the synchronising signal produced by the synchronising means comprises a series of clipped pulses, each pulse presenting one positive pulse of the supply. The zener diode D11 determines the maximum magnitude of the pulses of the synchronising signal and the reverse biassing of the zener diode D11 by the resistors D9 and R3 raises the mean potential of the synchronizing signal towards the voltage of the positive line P. This signal is fed to the base of circuit R10 C3 which integrates the rectangular waveform to a sawtooth waveform.

The magnitude of each of the pulses of the synchronising signal is so selected that, when the frequency of the supply is within the predetermined range, each of these pulses so modifies the gradient of the voltage rise at the base of transistor TR2 that the threshold voltage, i.e. the voltage at which this transistor turns on, is attained a predetermined time within the reception of each pulse of the synchronising signal. Thus, in these circumstances, the output from the multivibrator is synchronised with, but lags slightly behind, the supply.

By way of further explanation, let it be assumed that the relationship of the voltage at the base of TR2 with respect to time when the capacitor C3 of the multivibrator is charging at its natural frequency is a straight line having a certain known gradient. Now the reception of each pulse of the synchronising signal, integrated by the network R10 C3 will first decrease and then increase this gradient. Thus if a pulse is received within the predetermined range and reaches its maximum integrated value near the natural switch-on time of the transistor TR2, the increase in gradient will mean the threshold voltage of transistor TR2 is reached earlier — the turning on of this transistor will be advanced. Again, if the pulse reaches its minimum integrated value near the natural switch-on time of the transistor TR2, the decrease in gradient will delay the switch-on time. If the pulse arrives outside the predetermined range it will have insufficient effect on the switch-on time to ensure synchronism. That is, if it arrives early, even when at its maximum value, it will not elevate the voltage at the base of the transistor TR2 to the threshold voltage, on the other hand if it arrives late, the transistor will already have been switched on.

As previously stated when the frequency of the supply is within the predetermined limits, the multivibrator is alternately energising the bases of transistors TR3 and TR4 at the frequency of the supply but with a phase-shift to be in advance of the latter.

When the supply to the diode D4 changes to the positive half-cycle the collector of transistor TR3 is energised. The base of this transistor is however de-energised as the corresponding transistor TR2 of the multivibrator is still conducting; thus the transistor TR3 is turned off at this time and the gate of the SCR is held positive with respect to its cathode so that the SCR supplies power to the lamp L.

A short time after this the transistor TR2 is switched on and the transistor TR1 is turned off as a result of the reception of a synchronising pulse by the multivibrator. This turns the transistor TR3 on thus isolating the gate of the SCR from the positive supply by diode D7; however, the positive supply through D6, F2 and Lamp L to the anode of the SCR continues for the rest of the half-cycle maintaining the SCR in conduction, and the lamp L remains energised.

In a similar fashion the lamp L is energised when the supply to the diode D3 is in the positive half-cycle.

The SCR is thus triggered into conduction at the beginning of each half-cycle and the lamp L is energised continuously. Now consider the frequency of the supply to be outside the predetermined limits.

The difference between the supply frequency and the multivibrator frequency is too great for the synchronising circuit to be effective, and the multivibrator will run into and out of phase with the supply. When in phase the lamp L will be operated at full brilliance. When out of phase, assuming that the supply to diode D4 is at the positive half-cycle, the transistor TR3 is turned on and the gate of SCR is held at cathode potential, i.e. the SCR is non-conductive and the lamp is unenergised. Similarly, when the supply to D3 is at the positive half-cycle, the transistor TR4 is turned on and the lamp is unenergised.

Thus over a period of time lamp L is operated intermittently, the rate of flashing being a function of the difference between the supply frequency and the multivibrator frequency.

It will be appreciated that the lamp L could be replaced by, or supplemented wity, another indicator. For example the switching circuit could readily be adapted to control an audible warning device such as a horn, whenever the frequency deviated outside the predetermined range.

It is to be noted that the resistance capacitance circuit CR R10 and R13 C1 serves additionally to suppress any voltage transients in the supply so that these are unable to cause false operation of the multivibrator.

TYPICAL OPERATING CHARACTERISTICS:

| | |
|---|---|
| Nominal supply voltage: | 240 |
| Limits of supply voltage: | 200 – 280 |
| Frequencies at which lamp lit continuously: | 48–52 Hz |
| Frequencies at which lamp flashes: | 47 Hz and below |
| | 53 Hz and above |
| Lamp rating: | 12v 6 watt |
| Output rating: | 12v 12 watt |

I claim:

1. An indicating device comprising an input means which, in use, is connected into an AC electrical supply and which is adapted to produce a first series of pulses at a frequency corresponding to the frequency of the supply, a pulse generator means which is adapted to produce a second series of pulses within a predetermined operating range and which comprises a multivibrator which is arranged to derive a rectified and stabilized power supply from the AC electrical supply and which incorporates a resistance capacitance timing means, a switching circuit means which receives said first and second series of pulses and is adapted to operate to control an indicating device whenever pulses of said first and second series of pulses are in a predetermined phase relationship, said indicating device consisting of an electric lamp so as to provide a continuous visual indication while the frequency of the supply is within said range and to provide an intermittent indication, the frequency of which depends on the deviation of the frequency of the supply from said range, wherein said switching circuit means comprises a silicon controlled rectifier, the gate of which is energized under the control of a transistor switching circuit which is rendered conductive to pulses of said first series on receiving each pulse of said series, the gate of the silicon controlled rectifier being de-energized while the transistor switching circuit is receiving pulses of both of said series, and a synchronizing circuit means for synchronizing said second series of pulses in said predetermined phase relationship when the frequency of the latter is within the predetermined operating range of the pulse generator so that, when the frequency of the supply is within said range, said switching circuit means is operated substantially continuously.

2. An indicating device in accordance with claim 1, wherein the synchronizing circuit means is arranged to supply synchronizing pulses of a predetermined waveform and polarity and at the frequency of the supply into the resistive capacitance timing means of the multivibrator so to modify the operation of the latter as to bring the output thereof into a predetermined phase relationship with the supply, the maximum amplitude of the pulses supplied by the synchronizing circuit being limited so as to determine the effect of said synchronizing pulses outside the aforesaid predetermined range.

3. An indicating device in accordance with claim 2, wherein the resistance capacitance timing means of the multivibrator is arranged to integrate the synchronizing pulses so as to ensure that the pulses of the said second series, when synchronized as aforesaid, exhibit a phase shift which is less than 180° with respect to said first series.

* * * * *